(12) United States Patent
Tadokoro et al.

(10) Patent No.: US 6,254,980 B1
(45) Date of Patent: *Jul. 3, 2001

(54) METALLIC SHEET HAVING RUST-PREVENTIVE ORGANIC COATING THEREON, PROCESS FOR THE PRODUCTION THEREOF AND TREATING FLUID THEREFOR

(75) Inventors: Kenichiro Tadokoro; Hiromasa Shoji; Tadashi Sakon; Ikuo Jitsuhara; Makoto Yamasaki, all of Kawasaki (JP)

(73) Assignee: Nippon Steel Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,316
(22) PCT Filed: Dec. 17, 1996
(86) PCT No.: PCT/JP96/03676
  § 371 Date: Jun. 16, 1998
  § 102(e) Date: Jun. 16, 1998
(87) PCT Pub. No.: WO97/22423
  PCT Pub. Date: Jun. 26, 1997

(30) Foreign Application Priority Data

Dec. 18, 1995 (JP) .................................. 7-327759
Oct. 21, 1996 (JP) .................................. 8-277837

(51) Int. Cl.⁷ ............................ B32B 5/16; B32B 15/08; B32B 15/16; B32B 27/30; B32B 31/00

(52) U.S. Cl. .................... 428/323; 428/325; 428/327; 428/461; 428/463; 252/389.52; 252/389.61; 252/389.62; 427/340; 427/341; 524/432; 524/417; 524/706; 524/783; 524/803

(58) Field of Search .................... 428/323, 327, 428/325, 461, 463; 524/803, 417, 706, 783, 432; 252/389.52, 389.61, 389.62; 427/340, 341

(56) References Cited

U.S. PATENT DOCUMENTS

| | | | |
|---|---|---|---|
| 4,444,601 | * 4/1984 | Greene | 148/31.5 |
| 4,795,492 | * 1/1989 | Othen | 106/14.21 |
| 5,427,863 | * 6/1995 | Siebert | 428/463 |
| 5,922,466 | * 7/1999 | Angelopoulos et al. | 428/418 |

FOREIGN PATENT DOCUMENTS

| | | |
|---|---|---|
| 5-31455 | 2/1993 | (JP) . |
| 5-286101 | 11/1993 | (JP) . |
| 7-207200 | 8/1995 | (JP) . |
| WO9116381 | 10/1991 | (WO) . |
| WO9314166 | 7/1993 | (WO) . |

* cited by examiner

Primary Examiner—Paul Thibodeau
Assistant Examiner—Ramsey Zacharia
(74) Attorney, Agent, or Firm—Kenyon & Kenyon

(57) ABSTRACT

A metal plate having a rust preventive organic layer, said rust-preventive organic layer being a colloid or micelle of a slightly water soluble organic corrosion inhibitor as an organic layer mixed with and dispersed in a matrix resin, its production process and a treatment liquid in which it is processed.

28 Claims, 1 Drawing Sheet

METALLIC SHEET HAVING RUST-PREVENTIVE ORGANIC COATING THEREON, PROCESS FOR THE PRODUCTION THEREOF AND TREATING FLUID THEREFOR

TECHNICAL FIELD

The present invention relates to a metal plate having a rust-preventive layer excellent in corrosion resistance and paint adhesion without using any hexavalent chromium, its production process, and a treatment liquid in which it is processed.

BACKGROUND ART

In the past, metal plate was typically treated with chromate to form a chromate layer in order to improve the corrosion resistance of cold rolled steel plate, zinc-plated steel plate, zinc alloy-plated steel plate, aluminum-plated steel plate, and so forth, used in automobiles, home appliances and construction material applications. Electrolytic chromate and coated chromate are examples of this chromate treatment. In the case of electrolytic chromate, for example, sheet steel was treated by cathode electrolysis using a bath having as its main component chromic acid to which were also added sulfuric acid, phosphoric acid, boric acid and various type of halogen and other ions. In addition, in the case of coated chromate, due to the problem of elution of chromate from the chromate treated steel plate, a process is known, for example, in which the steel sheet is treated with a liquid containing inorganic colloids and inorganic anions in addition to chromic acid in which a portion of the hexavalent chromium was reduced to trivalent chromium, in advance, or to chromic acid having a specific ratio of hexavalent chromium to trivalent chromium. In addition, other methods that have been developed include a method in which the chromium is blocked by compounding with an organic polymer, and a method in which the chromate layer is additionally covered with an organic polymer.

Although chromate layer formed by electrolysis exhibit a low level of elution of hexavalent chromium, their corrosion resistance cannot be said to be adequate. In addition, the chromate layer is susceptible to damage during machining. Thus, there are certain problems with corrosion resistance after machining. In addition, in the case of chromate layer formed by coating, when used without modification after treatment, elution of a portion of the hexavalent chromium from the chromate layer cannot be avoided. Resin-chromate has been developed to reduce this dissolving of the chromate layer. However, deterioration of the resin due to the high oxidation effects of chromic acid cannot be avoided, thus preventing these chromate layers from having adequate coating reliability in terms of industrial use. Although improved technologies can be found, such as that which makes various adjustments in the resin structure as disclosed in Japanese Unexamined Patent Publication No. 5-230666, and that which attempts to achieve significant improvements in workability and long-term coating stability involving the response of the chromate layer to a corrosive environment by regulating the form in which hexavalent chromium exists in the chromate layer as disclosed in Japanese Patent Application No. 7-149200, filed by the inventors of the present application, none of these can be said to be adequate from the viewpoint of completely inhibiting elution of hexavalent chromium.

In this way, in order to completely inhibit elution of hexavalent chromium, it is necessary to develop a rust-preventive layer having functions identical to chromate layer containing hexavalent chromium of the prior art, but without using any hexavalent chromium whatsoever.

Until now, corrosion inhibitors have been developed for the purpose of inhibiting corrosion of metal placed in a corrosive environment. This consisted mainly of adding a trace amount of an inhibitor to a corrosive solution, adsorbing onto the surface of the metal, and forming a passivating layer to decrease activation of the metal surface and inhibit ionized elution, and many such materials are known. Prominent examples of inorganic compounds of these materials include hexavalent chromium salts, silica, phosphates and vanadates. Prominent examples of organic compounds include carboxylic acids such as benzoates and azelates, and compounds containing —S— and —N— which easily form complexes with metal ions. However, since these compounds demonstrate effects when trace amounts are added to a corrosive solution, those compounds that are able to form a layer on a metal surface and clearly demonstrate long-term reliability are only chromate treatment and phosphate treatment including phosphate treatment. In the case of organic compounds in particular, their reliability when used as single layer is extremely low.

For example, a paint composition and layer have been proposed that are characterized by containing 0.01 to 10 percent by weight (as solid) of an organic corrosion inhibitor having a nitrogen atom in its molecule in a water-based paint as disclosed in Japanese Unexamined Patent Publication No. 4-318071 and Japanese Unexamined Patent Publication No. 5-214273. Although water-soluble organic corrosion inhibitors and slightly water-soluble organic corrosion inhibitors proposed in the above are both indicated in said patents, no clear distinction therebetween is made. In the case that the organic corrosion inhibitor is water-soluble, it elutes outside the layer when moisture enters in a corrosive environment, thereby preventing it from demonstrating adequate corrosion resistance. In addition, in the case of a slightly water-soluble organic corrosion inhibitor, it is typically extremely difficult to disperse the inhibitor in water-based paints and, if simply mixed, causes aggregation in the paint or in the layer formed. Since this impairs the uniformity of the paint or layer, the stability of the paint, as well as the resulting corrosion inhibitory effects, are inadequate. As a result of corrective measures still having not been taken despite the existence of these problems, the corrosion resistance that is obtained is inadequate.

In addition, in Japanese Unexamined Patent Opposition No. 7-97534, although a paint is proposed that contains 0.05 to 25 percent by weight of one or more types of alkynes, alkinols, amines or their salts, thio compounds, heterocyclic compounds, polycarboxylic acid compounds or their salts, aromatic carboxylic acid compounds or their salts and lignin sulfonates or their salts, during application to metal plate, the formation of a chromate layer or zinc phosphate layer that serves as a rust preventive layer is essential for pretreatment, and it cannot be expected to demonstrate corrosion resistance when used as a single organic layer.

As has been described above, in the case of an single layer containing an organic corrosion inhibitor, when the organic corrosion inhibitor is water-soluble, it elutes outside the layer when water enters in a corrosive environment, thereby preventing adequate corrosion resistance. In addition, when the organic corrosion inhibitor is hardly water-soluble, it aggregates in the paint or layer thereby creating problems in the dispersion method or dispersion form. It is assumed that this type of organic corrosion inhibitor is unable to demonstrate adequate corrosion resistance because a site at which the organic corrosion inhibitor is able to act efficiently cannot be obtained within the layer. Moreover, since the effect of organic corrosion inhibitors consists of inhibiting corrosion by forming a complex with metal ions, or in other words, anodic corrosion resistance which functions mainly by inhibition of metal ionization involving deposition at the interface after forming a complex with eluted metal ions, and the pH region at which complex-forming functional groups required for complex formation are dissociated is unevenly distributed primarily in the neutral region, at low pH regions of the anode portion or in a rising pH environment present during the early stages of corrosion, the effects of the organic corrosion inhibitor are expected to be weak. In addition, aside from their corrosion prevention ability, since the layer formation capability of these organic corrosion inhibitors onto a metal surface is generally inferior to inorganic corrosion inhibitors and is considerably dependent upon environmental changes at the interface, it results in the problem of difficulty in maintaining stable adhesiveness. As a result, an organic compound that offers both corrosion prevention and adherence to a certain extent must be selected, thus making further decreases in corrosion prevention unavoidable. The uses of these corrosion inhibitors are limited to certain types of metals, and nearly all are limited to use as paint additives.

DISCLOSURE OF THE INVENTION

As a result of earnest research conducted by the inventors of the present invention to solve the problems of the above-mentioned organic corrosion inhibitors or layer and to design a general-purpose chemical treatment layer to take the place of current chromate treatment in a system that is completely free of hexavalent chromium, it was found that the problems could be solved by providing an organic corrosion inhibitor having effective corrosion resistance in the form of a fine colloid or micelle and giving the ability to form a layer from resin. Accordingly, it became possible to dissolve the organic corrosion inhibitor and demonstrate its function in a corrosion-inducing and corrosion-promoting environment (infiltration of moisture, change in pH, etc.), to thereby give the inhibitor a repair function that is selective for the corrosion site. Moreover, the corrosion-resistance function of the inhibitor can be enhanced by giving it the ability to prevent cathodic corrosion by using a non-chromic inorganic colloid or electrically conductive polymer colloid, thereby making it possible to obtain a resin-based chemical treatment layer in which each material is able to efficiently demonstrate its function.

The gist of the present invention is described below.

(1) A metal plate having a rust-preventive organic layer characterized by a metal plate having a rust-preventive layer comprising a colloid or micelle of a hardly water-soluble organic corrosion inhibitor dispersed in a matrix resin.

(2) A metal plate having a rust-preventive organic layer described in (1) above wherein the above-mentioned colloid or micelle has a average particle size of less than 1 μm.

(3) A metal plate having a rust-preventive organic layer described in (1) or (2) above wherein the above-mentioned colloid or micelle has a average particle size of 0.3 μm or less.

(4) A metal plate having a rust-preventive organic layer described in (1) through (3) above wherein the above-mentioned hardly water-soluble organic corrosion inhibitor is one type or a mixture of two or more types of thioglycolate esters, mercaptocarboxylic acids, N-substituted derivatives of 2,5-dimethylpyrrole, derivatives of 8-hydroxyquinoline, derivatives of triazinethiol, ester derivatives of gallic acid and electrically conductive polymers.

(5) A metal plate having a rust-preventive organic layer described in (1) through (4) above wherein the above-mentioned matrix resin is a non-water-soluble copolymer resin composed of an organic polymer comprising one or a mixture of two or more types selected from vinyl-based carboxylic acids, vinyl-based amines, vinyl-based alcohols and vinyl-based phosphates having a high affinity with water, and one or a mixture of two or more types selected from vinyl-based compounds and olefins which have a low affinity with water and do not form a hydrate.

(6) A metal plate having a rust-preventive organic layer described in (1) through (4) above wherein the above-mentioned matrix resin is obtained from a non-water-soluble core-shell type emulsion resin having a core phase of an organic polymer of one or a mixture of two or more types selected from vinyl-based monomers and olefins which do not form a hydrate, and a shell phase of an organic polymer of a monomer having high affinity with water.

(7) A metal plate having a rust-preventive organic layer described in (1) through (4) above wherein the above-mentioned matrix resin is a resin made non-water-soluble by curing a water-soluble vinyl-based resin using block isocyanate, amine or carboxylic acid.

(8) A metal plate having a rust-preventive organic layer described in (1) through (7) above wherein said rust-preventive organic film contains as additive in the above-mentioned matrix resin one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4 \cdot nH_2O$, $TiO_2$, $ZrPO_4$, $ZnO$, $La_2O_3$, $CeO_2$ and $Al_2O_3$ as well as colloids of complex compound of these inorganic substances.

(9) A metal plate having a rust-preventive organic layer described in (1) through (8) above wherein said rust-preventive organic layer contains, as a passivating layer forming aid in the above-mentioned matrix resin, one or a mixture of two or more types selected from orthophosphoric acid, poly-phosphoric acids and meta-phosphoric acids.

(10) A metal plate having a rust-preventive organic layer described in (1) through (8) above wherein said rust-preventive organic layer contains, as a passivating layer forming aid in the above-mentioned matrix resin, one or a mixture of two or more types selected from orthophosphoric acid, poly-phosphoric acids and meta-phosphoric acids, and one type or a mixture of two or more types selected from cerium salts and lanthanum salts.

(11) A treatment liquid for forming a rust-preventive organic layer, characterized by comprising a layer forming resin dissolved or dispersed in an aqueous medium, and a colloid or micelle of a hardly water-soluble organic corrosion inhibitor dispersed in said aqueous medium.

(12) A treatment liquid for forming a rust-preventive organic layer described in (11) above wherein said colloid or micelle has a average particle size of less than 1 μm.

(13) A treatment liquid for forming a rust-preventive organic layer described in (11) or (12) above wherein said colloid or micelle has a average particle size of 0.3 μm or less.

(14) A treatment liquid for forming a rust-preventive organic layer described in (10) through (13) above wherein the above-mentioned hardly water-soluble organic corrosion inhibitor is one type or a mixture of two or more types of thioglycolate esters, mercaptocarboxylic acids, N-substituted derivatives of 2,5-dimethylpyrrole, derivatives of 8-hydroxyquinoline, derivatives of triazinethiol, ester derivatives of gallic acid and electrically conductive polymers.

(15) A treatment liquid for forming a rust-preventive organic layer described in (11) through (14) above wherein the above-mentioned layer forming resin is a non-water-soluble copolymer resin composed of an organic polymer comprising one or a mixture of two or more types selected from vinyl-based carboxylic acids, vinyl-based amines, vinyl-based alcohols and vinyl-based phosphates having a high affinity with water, and one or a mixture of two or more types selected from vinyl-based compounds and olefins which have a low affinity with water and do not form a hydrate.

(16) A treatment liquid for forming a rust-preventive organic layer described in (11) through (14) above wherein the above-mentioned layer forming resin is a non-water-soluble core-shell type emulsion resin having a core phase of an organic polymer of one or a mixture of two or more types selected from vinyl-based monomers and olefins which do not form a hydrate, and a shell phase of an organic polymer of a monomer having high affinity with water.

(17) A treatment liquid for forming a rust-preventive organic layer described in (11) through (14) above wherein the above-mentioned film forming resin is a resin made non-water-soluble by curing a water-soluble vinyl-based resin using block isocyanate, amine or carboxylic acid.

(18) A treatment liquid for forming a rust-preventive organic layer described in (11) through (17) containing as additive one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4.nH_2O$, $TiO_2$, $ZrPO_4$, $ZnO$, $La_2O_3$, $CeO_2$ and $Al_2O_3$ as well as colloids of complex compound of these inorganic substances.

(19) A treatment liquid for forming a rust-preventive organic layer described in (11) through (18) above containing as a passivating film forming aid one or a mixture of two or more types selected from orthophosphoric acid, polyphosphoric acids and meta-phosphoric acids.

(20) A treatment liquid for forming a rust-preventive organic layer described in (11) through (18) above containing as a passivating film forming aid one or a mixture of two or more types selected from orthophosphoric acid, polyphosphoric acids and meta-phosphoric acids, and one type or a mixture of two or more types selected from cerium salts and lanthanum salts.

(21) A process for producing a metal plate having a rust-preventive organic layer, characterized by comprising applying to the surface of a metal plate a treatment liquid comprising a layer forming resin dissolved or dispersed in an aqueous medium, and a colloid or micelle of a hardly water-soluble organic corrosion inhibitor dispersed in said aqueous medium, drying and, curing to form a rust-preventive organic layer on the surface of said metal plate.

(22) A process for producing a metal plate having a rust-preventive organic layer described in (21) above wherein said colloid or micelle has a average particle size of less than 1 $\mu$m.

(23) A process for producing a metal plate having a rust-preventive organic layer described in (21) or (22) above wherein said colloid or micelle has a average particle size of 0.3 $\mu$m or less.

(24) A process for producing a metal plate having a rust-preventive organic layer described in (21) through (23) above wherein the above-mentioned hardly water-soluble organic corrosion inhibitor is one type or a mixture of two or more types of thioglycolate esters, mercaptocarboxylic acids, N-substituted derivatives of 2,5-dimethylpyrrole, derivatives of 8-hydroxyquinoline, derivatives of triazinethiol, ester derivatives of gallic acid and electrically conductive polymers.

(25) A process for producing a metal plate having a rust-preventive organic layer described in (21) through (24) above wherein the above-mentioned layer forming resin is a non-water-soluble copolymer resin composed of an organic polymer comprising one or a mixture of two or more types selected from vinyl-based carboxylic acids, vinyl-based amines, vinyl-based alcohols and vinyl-based phosphates having a high affinity with water, and one or a mixture of two or more types selected from vinyl-based compounds and olefins which have a low affinity with water and do not form a hydrate.

(26) A process for producing a metal plate having a rust-preventive organic layer described in (21) through (24) above wherein the above-mentioned layer forming resin is a non-water-soluble core-shell type emulsion resin having a core phase of an organic polymer of one or a mixture of two or more types selected from vinyl-based monomers and olefins which do not form a hydrate, and a shell phase of an organic polymer of a monomer having high affinity with water.

(27) A process for producing a metal plate having a rust-preventive organic layer described in (21) through (24) above wherein the above-mentioned layer forming resin is a resin made non-water-soluble by curing a water-soluble vinyl-based resin using block isocyanate, amine or carboxylic acid.

(28) A process for producing a metal plate having a rust-preventive organic layer described in (21) through (27) wherein one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4.nH_2O$, $TiO_2$, $ZrPO_4$, $ZnO$, $La_2O_3$, $CeO_2$ and $Al_2O_3$ as well as colloids of complex compound of these inorganic substances is contained as an additive.

(29) A process for producing a metal plate having a rust-preventive organic layer described in (21) through (28) above wherein one or a mixture of two or more types selected from ortho-phosphoric acid, poly-phosphoric acids and meta-phosphoric acids is contained as a passivating layer forming aid.

(30) A process for producing a metal plate having a rust-preventive organic layer described in (21) through (28) above wherein one or a mixture of two or more types selected from ortho-phosphoric acid, poly-phosphoric acids and meta-phosphoric acids, and one type or a mixture of two or more types selected from cerium salts and lanthanum salts is contained as a passivating layer forming aid.

(31) A process for producing a metal plate having a rust-preventive organic layer described in (21) through (30) above wherein a hardly water-soluble organic corrosion inhibitor is dissolved in a solvent and deposited and dispersed in the form of a fine colloid or micelle in a non-solvent and to which a passivated layer forming aid and inorganic colloid are mixed and a dispersant as necessary is added to improve dispersivity and a matrix resin is added to form the above-mentioned treatment liquid.

BEST MODE FOR CARRYING OUT THE INVENTION

The following provides a detailed explanation of the present invention in accordance with the drawings.

As a result of dissolving a hardly water-soluble organic corrosion inhibitor in a solvent (protic polar solvent, etc.) and precipitating by placing in water as a non-solvent to form a fine colloid or micelle, a strong interaction with resin is inhibited as well as, during entry of moisture in a corrosive environment following layer formation, a portion of the layer is dissolved to exhibit rust preventive effects. That is, the function of a gradually-released rust preventive is provided. In addition, the resulting rust preventive colloid or micelle is blended with an inorganic colloid having the ability to prevent cathodic corrosion as well as a resin having excellent layer forming properties and adhesion with metal surfaces, to improve its corrosion inhibitory function.

Figure 4:
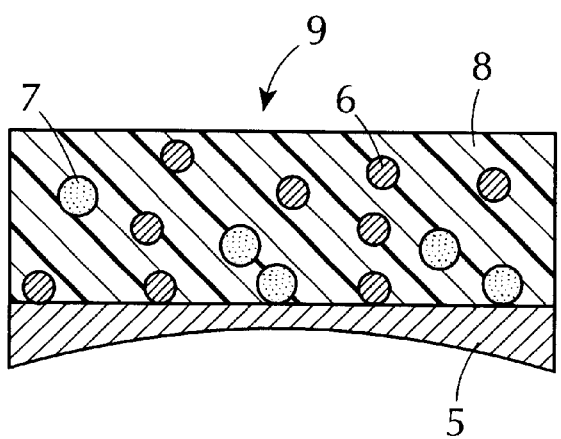
FIG. 4 is a cross-sectional conceptual drawing of a chemical treatment layer.

FIG. 4 is a cross-sectional conceptual drawing of a chemical treatment layer. As shown in FIG. 4, a chemical treatment layer 9 is formed on the surface of metal plate 5, and a state is formed in the chemical treatment layer 9 wherein a colloid or micelle 6 of a hardly water-soluble organic corrosion inhibitor and inorganic colloid 7 are dispersed in a matrix resin 8.

The size of the particles dispersed in the form of a colloid or micelle is said to generally be 1 $\mu$m or less. It is important in the present invention that, by using a resin-based chemically treating liquid in which an organic corrosion inhibitor is dispersed in the form of a colloid or micelle, the size of the particles of the treatment liquid becomes substantially the particle size of the dispersed particles of organic corrosion inhibitor in the resin-based chemically treated layer, and the organic corrosion inhibitor is finely dispersed in the resin layer enabling it to efficiently exhibit corrosion preventive functions. Namely, the average particle size of the particles of the colloid or micelle of the organic corrosion inhibitor dispersed in a resin-based chemical treatment liquid or resin-based film (although secondary particles consisting of aggregations of primary particles are also present in addition to primary particles, this refers to all particles present in the dispersed state) is less than 1 $\mu$m, preferably 0.7 $\mu$m or less, more preferably 0.3 $\mu$m or less and particularly preferably 0.15 $\mu$m or less.

It is preferable that the particle size of the colloid or micelle of organic corrosion inhibitor be sufficiently small relative to the layer thickness. Even if the particle size is, for example, 1 $\mu$m or less, if the resin layer is too thin and the particles are not incorporated in the resin matrix, the layer has numerous defects that result in impaired corrosion resistance. As a general reference, it is preferable that the particle size be no larger than half the layer thickness.

Figure 1:
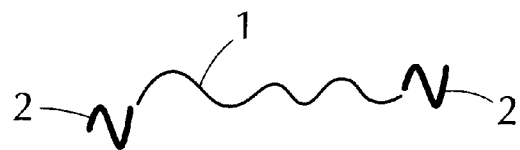
FIG. 1 is a schematic drawing of the polymer chain structure of a copolymer resin and telechelic resin.
Figure 2:
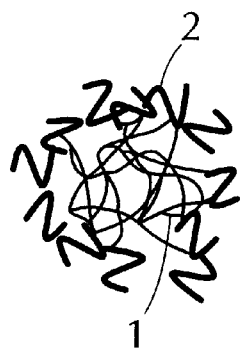
FIG. 2 is a schematic drawing of a polymer chain aggregate (dispersion unit) resulting from aggregation of the polymer chains of a copolymer resin and telechelic resin in water.
Figure 3:
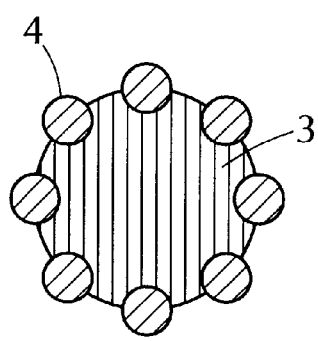
FIG. 3 is a schematic drawing of the particle structure of a core-shell type emulsion resin.

It is preferable that the matrix resin as claimed in the present invention be a non-water-soluble copolymer resin and telechelic resin composed of a molecular skeleton that has a high affinity for water and adheres to the surface of metal materials by adsorption, hydrogen bonds and so forth, while the remainder is a molecular skeleton that has no affinity for water, or a core-shell type emulsion resin composed of both the above molecular skeletons, or a curing resin that is a water-soluble resin and is cured and made non-water-soluble by a crosslinking agent contained in a paint during layer forming treatment. The structure of the non-water-soluble resin is shown in FIGS. 1, 2 and 3. FIG. 1 is a schematic drawing of the molecular chain structure of a copolymer resin and telechelic resin, FIG. 2 is a schematic drawing showing the polymer chain aggregate (dispersion unit) formed by aggregation of polymer chains of the above resin in water, and FIG. 3 is a schematic drawing of the particle structure of a core-shell type emulsion resin. In the case of a resin using this type of water for the dispersant, when it is the non-water-soluble resin, the molecule skeleton portion that has a high affinity for water in an aqueous solvent (2 and 4 in the drawings) forms the uppermost surface layer and covers the molecular skeleton portion that has no affinity for water (1 and 3 in the drawings), which improves the mutual dispersivity of the resin particles and ensures stable dispersivity of the added colloid particles. In addition, in the case of the water-soluble resin, the molecular chain in an aqueous vehicle is stably dispersed in a completely hydrated state, and has good dispersivity with colloid particles.

The reason for using a matrix resin having this type of structure is that it serves as a skeleton that ensures stable dispersivity of colloid particles and has stable properties as a treatment layer state, and has the properties of a gas barrier, ion permeation resistance, paint adhesiveness, finger print resistance, adhesion to metal surfaces and processability, and that the molecular skeleton portion having affinity with water absorbs water during entry of moisture in a corrosive environment to act as a site for dissolving of a corrosion inhibitor colloid and exhibiting its function.

Thus, it is desirable to employ this type of resin structure. Examples of the resin composition thereof, in the case of a non-water-soluble copolymer resin, include copolymer resins having for their monomers vinyl-based and olefin-based compounds. These are produced by various types of polymerization methods such as solvent polymerization, bulk polymerization, interfacial polymerization, suspension polymerization and emulsion polymerization. The copolymer resin has the main skeleton composed of a polymer of a non-water-soluble, vinyl-based and olefin-based monomers and having, on both of its ends, an organic polymer of vinyl-based carboxylic acid, vinyl-based amine, vinyl-based sulfonic acid, vinyl-based alcohol, vinylphenol or vinyl-based phosphate and so forth having a high affinity with water and metal surfaces. The telechelic resin is obtained by introducing groups having affinity with water and metal surfaces on both ends using a chain transfer agent in the polymerization process of the non-water-soluble skeleton portion. The emulsion resin comprises a polymer of non-water-soluble vinyl-based or olefin-based monomer as the core phase and a polymer of a monomer having a high affinity with metal surfaces as the shell phase.

Furthermore, in the case of these copolymer and core-shell type emulsion resins, although the weight ratio of the skeleton portion having a high affinity for water and metal surface to the non-water-soluble skeleton portion is preferably high in order to ensure adhesion with metal surface, if this weight ratio is excessively high, the coefficient of water absorption increases resulting in the occurrence of separation of the layer due to water swelling, which is undesirable. In addition, if the above-mentioned weight ratio is too low, adhesion with paint is impaired which is also undesirable. Thus, it is desirable that this weight ratio be adjusted to within a range from 3/100 to 3/2, and preferably from 1/20 to 1/1. In addition, the above-mentioned resins are not limited to these resins, but rather other resins used in water dispersed paints may also be used without problem.

In addition, in the case of water-soluble resins, examples of resins that can be used include a polymer of a water-soluble vinyl-based monomer, a water-soluble resin composed of a polymer of water-soluble vinyl-based monomers, or a water-soluble vinyl-based resin composed of a copolymer of a water-soluble vinyl-based monomer and a non-water-soluble vinyl-based monomer, which becomes non-water-soluble due to the occurrence of crosslinking between polymer molecular chains by a curing agent as a result of containing crosslinking functional groups (such as unsaturated bonds, —OH, —COOH and —NH$_2$) in its skeleton. Monomers containing polar groups can be used for the water-soluble vinyl-based monomer.

These polar groups refer to —COOH, —SO$_3$H, —P(O)(OH)$_2$, —OH and other proton donating groups, or their salts, esters and —NH$_2$, —NHR, —NRR' (where R and R' are alkyl groups or allyl groups) and other proton accepting groups. Moreover, they also refer to quaternary ammonium groups having ionic bonds or amphoteric polar groups containing a mixture of proton donating and accepting groups. A vinyl-based compound into which one or several types of these polar groups have been introduced can be used as the monomer. In addition, one or a mixture of two or more types of compounds selected from styrene, α-methylstyrene, vinyltoluene, chlorostyrene, alkyl(meth)acrylate esters and allyl(meth)acrylate esters can be used as the non-water-soluble vinyl-based monomer.

Incidentally, introduction of this non-water-soluble vinyl polymer skeleton is performed to adjust the degree of crosslinking during curing by adjusting the total water solubility of the polymer. Although there are no particular restrictions on the amount, it is preferable to adjust the amount introduced so that the total solubility of the polymer in water is at least 5% by weight and preferably at least 10% by weight under normal pressure at 25° C. The polymer can be produced by using one type or two or more types of these monomers. Moreover, the polymer may be made water soluble by introducing the abovementioned functional groups into the non-water-soluble polymer. In addition, general-purpose amines, carboxylic acids and block isocyanates and so forth can be used as the crosslinking agent, and the polymer can be made non- water-soluble by forming urethane bonds, acid amide bonds or ester bonds and so forth between polymer molecular chains.

A hardly water-soluble organic corrosion inhibitor is supplied to the above-mentioned matrix resin in the form of a fine colloid or micelle dispersed in water. Since this organic corrosion inhibitor has the ability to adhere to metal surfaces and form a complex during elution of metal ions to capture those ions, it has the effect of inhibiting further progress of ionization. It is preferable that said corrosion inhibitor be a hardly water-soluble compound. This is because it gives the ability to respond to a corrosive environment since it is expected to demonstrate corrosion inhibitory effects by partially dissolving using the entry of moisture as a trigger. In addition, if said compound is water-soluble, the compound does not exhibit its function as a result of easily flowing out from the film during entry of moisture into the film. Alternatively, in the case of a paint system in which an organic compound that serves as a good solvent of an organic corrosion inhibitor is used as the dispersant, the corrosion inhibitor becomes rigidly fixed in the resin film during film formation, which is undesirable since its corrosion inhibitory effects decrease. Compounds that can be used for this hardly water-soluble organic corrosion inhibitor include those having at least two functional groups necessary for formation of metal complex bonds (═O, —NH$_2$, ═NH, ═N—, ═S, —OH, etc.) and those having a functional group that allows the formation of covalent bonds with a metal surface (—OH, ═NH, —SH, —COH, —COOH, etc.).

Specific examples of these compounds include thioglycolate esters, mercaptocarboxylic acids, N-substituted derivatives of 2,5-dimethylpyrrole, derivatives of 8-hydroxyquinoline, derivatives of triazinethiol and ester derivatives of gallic acid. There are also electrically conductive polymers used as organic materials that have a different corrosion prevention mechanism than the examples indicated above. These refer to single polymers having repeting units of widened λ-electron conjugate bonds throughout the entire molecule, known examples of which include polyacetylene, polyaniline, polythiophene and polypyrrole. These compounds can be given electrical conductivity by adding various types of electrolytes as dopants. In addition, in the case of polyaniline, grades having improved solubility in water and electrical conductivity by providing electrolytic functional groups (such as sulfone groups) within the molecular skeleton have been developed and are commercially available. These compounds have low solubility in water and can be dispersed in water in the form of fine colloids.

Although the details of the corrosion prevention effects of these electrically conductive polymers is unknown, it is presumed that since these compounds are electrically conductive, they are able to demonstrate corrosion current rectifying effects and oxygen reduction inhibitory effects at the interface to act as a cathode corrosion inhibitor. Although various types of electrically conductive polymers can be used, it is necessary that they have a certain degree of solubility in water in order to demonstrate corrosion prevention effects by dissolving during entry of moisture in a corrosive environment. However, if water solubility is excessively high, outflow from the layer occurs resulting in a decrease in function. Consequently, it is preferable that they be adjusted to from 0.1 parts by weight to 10 parts by weight, and preferably from 0.1 parts by weight to 5 parts by weight, at normal pressure and 25° C.

Furthermore, although one type or a mixture of two or more types of these hardly water-soluble organic corrosion inhibitors are used, the total mixed amount is such that the amount of organic corrosion inhibitor added relative to the amount of matrix resin results in a ratio of matrix resin to hardly water-soluble organic corrosion inhibitor (weight ratio) of from 100:1 to 1:2, preferably from 100:1 to 2:1. If the amount of the added organic corrosion inhibitor is such that the weight ratio of matrix resin to refractory organic corrosion inhibitor is 1:2 or greater (not less than 2), the properties of the resin layer are significantly impaired. In addition, if the ratio is 100:1 or less (not more than 1), corrosion prevention effects are significantly decreased. For this reason, it is preferable that the weight ratio be within the above-mentioned range.

Examples of these thioglycolate esters include aliphatic thioglycolate esters such as n-butyl thioglycolate and octyl thioglycolate, and aromatic thioglycolate esters such as phenyl thioglycolate and naphthyl thioglycolate.

Mercaptocarboxylic acids are organic compounds containing at least one mercapto group and one carboxyl group each in their molecule and examples include α-aliphatic mercaptocarboxylic acids such as α-mercaptolauric acid and α-mercaptocaproic acid along with their metal salts, as well as heterocyclic mercaptocarboxylic acids such as mercaptonicotinic acid and 2-mercapto-1-acetotriazole along with their metal salts.

Examples of N-substituted forms of 2,5-dimethylpyrrole include N-substituted forms such as N-butyl-2,5-dimethylpyrrole and N-phenyl-2,5-dimethylpyrrole along with their derivatives such as N-phenyl-3-formyl-2,5-dimethylpyrrole and N-phenyl-3,4-diformyl-2,5-dimethylpyrrole. Examples of derivatives of 8-hydroxyquinoline include 8-hydroxyquinoline, their carboxylated and sulfonated derivatives along with their metal salts.

Examples of triazinethiol derivatives include tertiary amine-substituted triazinethiols such as 6-(N,N'-dibutyl)-amino-1,3,5-triazine-2,4-dithiol and 6-(N,N'-octyl)-amino-1,3,5-triazine-2,4-dithiol.

Examples of ester derivatives of gallic acid include aliphatic esters and aromatic esters such as octyl gallate, stearyl gallate and phenyl gallate.

Examples of electrically conductive polymers include polyacetylene, polyaniline, polypyrrole and polythiophene, their carboxyl group derivatives, their sulfon group derivatives and their metal salts.

Non-chrome-based inorganic colloids are added to complement the corrosion prevention effects of the above-mentioned organic corrosion inhibitor and enhance the ability to prevent cathodic corrosion. Specific examples of these include $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_4$, $CaSiO_3$, $ZrSiO_3$, $AlPO_4 \cdot nH_2O$, $TiO_2$, $ZrPO_4$, $ZnO$, $La_2O_3$, $CeO_2$ and $Al_2O_3$ as well as colloids of complex compounds of these inorganic substances (complex oxides of La/Ce, complex phosphates of La/Ce, etc.). One type of a mixture of two or more types of these can be used. If the amount of this inorganic colloid added is a weight ratio of 1:2 or greater (not less than 2) in terms of the ratio of matrix resin to inorganic colloid, the properties of the resin layer are significantly impaired. In addition, if the ratio is 50:1 or less (not more than 1), corrosion prevention effects are not demonstrated. Consequently, it is preferable that the ratio of matrix resin to inorganic colloid (weight ratio) be from 50:1 to 1:2, and preferably from 20:1 to 2:1.

In addition, examples of a passivating layer forming aid include one type of a mixture of two or more types selected from ortho-phosphoric acid, poly-phosphoric acids and meta-phosphoric acids. One type or a mixture of two or more types selected from cerium salts and lanthanum salts can be added as necessary. Examples of trivalent cerium salts include cerium acetate, cerium nitrate, cerium chloride, cerium carbonate, cerium oxalate and cerium sulfate. In addition, examples of quaternary cerium salts include cerium sulfate, ammonium cerium sulfate, ammonium cerium nitrate, diammonium cerium sulfate and cerium hydroxide. Examples of lanthanum salts include lanthanum carbonate, lanthanum chloride, lanthanum nitrate, lanthanum oxalate, lanthanum sulfate and lanthanum acetate.

It is preferable that a cerium salt, a lanthanum salt, or a mixture with phosphate, be added so that the mixing ratio as the ratio of (number of moles of Ce and La) to (number of moles of P) be adjusted to be between 2:1 and 1:100. Although it is possible to form a passivating layer during coating even when the above-mentioned phosphate is added alone, as a result of adding phosphate in the presence of cerium salt or lanthanum salt in the above-mentioned ratio, the ability of phosphate to form a passivating layer can be maintained for a long time. If the phosphate ratio is less than 2:1, the ability to form a passivating layer during treatment layer formation is impaired, and if the ratio of cerium or lanthanum is less than 1:100, the ability of phosphate to form a passivating layer can no longer be maintained for a long time.

With respect to the amounts added, if the blended weight ratio of matrix resin to passivating layer forming aid is 1:1 or greater (not more than 1), the moisture absorption of the film increases resulting in problems of coloring, decreased adhesion and so forth. In addition, if the above-mentioned ratio is 30:1 or less (not more than 1), the ability to form a passivating layer is lost and there are no effects. Consequently, it is desirable that the ratio (weight ratio) of matrix resin to passivating layer forming aid is from 30:1 to 1:1, and preferably from 20:1 to 2:1. In addition, if the concentration of matrix resin in the treatment liquid is less than 50 g/l, the layer forming ability decreases which is undesirable since the layer lacks stability as a rust preventive layer. Therefore, the concentration of matrix resin in the treatment liquid should be adjusted to at least 50 g/l and preferably at least 100 g/l.

Although there are no particular limitations on the metal plate that is the subject of the present invention, examples of suitable metal plate include fused plated steel plates such as fused zinc-plated steel plate, fused zinc-iron alloy-plated steel plate, fused zinc-aluminum-magnesium alloy-plated steel plate, fused aluminum-silicon alloy-plated steel plate and fused lead-tin alloy-plated steel plate, surface-treated steel plates such as electrically zinc-plated steel plate, electrically zinc-nickel alloy-plated steel plate, electrically zinc-iron alloy-plated steel plate and electrically zinc-chrome alloy-plated steel plate, and cold-rolled steel plates, as well as zinc, aluminum and other metal plates.

EXAMPLES

Matrix Resin (1) Copolymer Resin

A copolymer of poly(methacryl acid, 2-hydroxyethylacrylate, 2-hydroxyethylmethacrylate)poly (styrene, methylmethacrylate, n-butylmethacrylate, n-butylacrylate)-poly(methacrylate, 2-hydroxyethylacrylate, 2-hydroxyethylmethacrylate) was prepared by living anionic polymerization. Tetrahydrofuran (THF) was used for the solvent, and s-BuLi was used for the catalyst. The reaction was carried out successively using monomer charging ratios (weight ratio) of methylmethacrylate:2-hydroxyethylacrylate:2-hydroxyethylmethacrylate=3:4:3 (1st stage of polymerization, resin terminal), styrene:methylmethacrylate:n-butylmethacrylate:nbutylacrylate=5:5:10:60 (living polymerization, resin body), and methylmethacrylate:2-hydroxyethylacrylate:2hydroxyethylmethacrylate=3:4:3 (coupling polymerization, resin terminal). Furthermore, the reaction temperature was 40–60° C., and the monomer charging amount/solvent ratio was 2/100. Following completion of the reaction, the reaction solution was injected into petroleum ether and methanol to purify the resulting copolymer resin. Moreover, for the purpose of dispersing in water, after dissolving the copolymer resin in a polar solvent, the copolymer resin was poured in water, formed into fine particles by intense stirring, and then treated to remove the solvent and the concentration of the solid portion of the copolymer resin was adjusted.

(2) Telechelic Resin

An alcoholic hydroxyl group and carboxyl group were introduced onto the terminals of a copolymer of acrylic monomers by using mercaptopropionic acid, mercaptoethanol etc. as the chain transfer agent in an anionic polymerization reaction process of poly(styrene, methylmethacrylate, n-butylmethacrylate, n-butylacrylate). 5 parts by weight of styrene, 5 parts by weight of methylmethacrylate, 15 parts by weight of n-butylmethacrylate and 75 parts by weight of n-butylacrylate were charged in the form of monomers into 500 parts by weight of THF solvent, followed by the addition of 4,4'-azobis(4-cyanopentanic acid) as polymerization initiator to conduct polymerization at 80° C. or lower. Purification and dispersion in water were performed using the same procedures as in the case of the copolymer resin.

(3) Core-Shell Type Emulsion Resin

A core-shell type resin consisting of styrene (5 parts by weight), methylmethacrylate (5 parts by weight), n-butylmethacrylate (10 parts by weight), n-butylacrylate (60 parts by weight), methacrylate (6 parts by weight), 2hydroxyethylacrylate (8 parts by weight) and 2-hydroxyethylmethacrylate (6 parts by weight) was prepared by emulsion polymerization. 40 parts by weight of the total of the above monomers in terms of the charging ratios indicated in parentheses above were placed in 60 parts by weight of deionized water followed by the addition of 0.2 parts by weight of sodium dodecylbenzenesulfate as emulsifier and 0.2 parts by weight of ammonium persulfate as catalyst to prepare an emulsion resin while stirring intensely at 70° C. In addition, a water-based soap-free emulsion resin and so forth were suitably prepared according to the target properties of the film. In addition, commercially available water-based emulsion resins were also suitably purchased and used.

(4) Water-Soluble Resin and its Cured Form 15 parts by weight of 2-hydroxyethylacrylate were placed in 85 parts by weight of deionized water followed by addition of 0.3 parts by weight of ammonium persulfate as catalyst to prepare a water-based resin at 40° C. In addition, copolymers of 2-hydroxyethylacrylate and acrylic acid were also prepared using the same procedure. In addition, a copolymer of a water-soluble monomer and non-water-soluble monomer such as 2-hydroxyethylacrylate and n-butylacrylate were suitably prepared in an organic solvent using the method described in the example of preparation of a copolymer resin, and used after purifying and dissolving in water. Dicarboxylic acids such as adipic acid and terephthalic acid, diamines such as ethylenediamine, and isocyanates such as polyoxyethylene diisocyanate were used as crosslinking agents for the curing agent.

(5) SBR Latex

A commercially available styrene butadiene rubber latex containing carboxyl groups (Japan Synthetic Rubber) was used.

(A) 2–40 parts by weight of butyl thioglycolate, octyl thioglycolate, stearyl thioglycolate, α-mercaptolauric acid, α-mercaptocaproic acid, 8-hydroxyquinoline, 6-(N,N'-dibutyl)-amino-1,3,5-triazine-2,4-dithiol and lauryl gallate were each added separately to 100 parts by weight of alcohol (ethanol, isopropyl alcohol, etc.) and after completely dissolving, dropped into deionized water to prepare colloids or micelles of these organic corrosion inhibitors.

(B) In the above-mentioned corrosion inhibitor colloid preparation process, an alcohol solution of the corrosion inhibitor was dropped into a silica gel solution (Nissan Chemical, solid portion: 20% by weight, pH 2) or a cerium oxide sol solution (Johnson Matthey, 0.1 M/l of aqueous nitric acid, solid portion: 50 g/l, dispersed in nonionic surface activator) to form a colloid or micelle of organic corrosion inhibitor in an aqueous solution of dispersed inorganic colloid.

(C) N-phenyl-3-formyl-2,5-dimethylpyrrole was synthesized using the Knorr-Pall condensation reaction of 2,5-hexanedione and aniline, and after dissolving the obtained compound to 20% by weight in aqueous sulfuric acid at pH 1 by taking advantage of the solubility of said compound in acidic aqueous solutions, aqueous sodium hydroxide solution was dropped in to form a colloid in the pH range of 4 to 7.

(D) In the water-dispersed colloid preparation process of said N-phenyl-3-formyl-2,5-dimethylpyrrole, N-phenyl-3-formyl-2,5-dimethylpyrrole was dissolved to 20% by weight in the silica gel solution (Nissan Chemical, solid portion: 20% by weight, pH 2) or cerium oxide sol solution (Johnson Matthey, 0.1 M/l of aqueous nitric acid, solid portion: 50 g/l, dispersed in nonionic surface activator) described in (B) as a acidic aqueous solution and aqueous sodium hydroxide solution was then dropped in to form a colloid in the pH range of 4 to 7.

(E) A 1% by weight aqueous solution of polyaniline as electrically conductive polymer containing barium sulfate as dopant was purchased (Japan Carlit), and a water-dispersed colloid of electrically conductive polymer was prepared by concentrating by a factor of 15 by evaporation.

Treatment Liquid Preparation Method

The above-mentioned water-dispersed colloid or micelle of a hardly water-soluble organic corrosion inhibitor, matrix resin, non-chrome-based inorganic colloid, along with cerium chloride ($CeCl_3$), lanthanum nitrate ($La(NO_3)_3$) and/or phosphoric acid as passivating layer forming aid were blended and formed into a bath. The total amount of hardly water-soluble organic corrosion inhibitor was fixed at 40 g/l, the total amount of inorganic colloid at 40 g/l, resin at 100 g/l and phosphoric acid at 20 g/l. In addition, a liquid containing gallic acid as water-soluble organic corrosion inhibitor was also prepared for comparison purposes. The compositions of these treatment liquids are shown in Tables 1 and 2.

Treatment Layer Forming Method

The above-mentioned treatment liquids were coated onto steel plate, dried and cured to form a treatment layer. The steel plates used consisted of GI (fused galvanized steel plate, plated amount: 90 $g/m^2$), EG (electrically galvanized steel plate, plated amount: 20 $g/m^2$), SZ (fused zinc-aluminum alloy-plated steel plate, plated amount: 90 $g/m^2$, Zn/Al=95.2/4.8), AL (fused aluminum-silicon alloy-plated steel plate, plated amount: 120 $g/m^2$, Al/Si=90/10) and CR (cold rolled steel plate). Furthermore, a treatment liquid was prepared in the form of a chromate treatment liquid for the purpose of comparing with the chromate treated steel plates that contained 30 g/l as $CrO_3$ of partially starch-reduced chromic acid, 40 g/l of $SiO_2$ and 20 g/l of ortho-phosphoric acid. This treatment liquid was similarly coated onto a steel plate, dried and cured to form a treatment layer.

Furthermore, coating was performed using a bar coater with a layer thickness of about 1 μm after drying, and the coated layer was dried for 30 seconds at a plate temperature of 200° C. and cured.

TABLE 1

| Treatment Liquid | Matrix Resin (100 g/l) | Corrosion Inhibitor (40 g/l) | | Inorganic Colloid (40 g/l) | | Passivating Layer Forming Aid | Remarks |
|---|---|---|---|---|---|---|---|
| 1 | Copolymer resin | *TGB: *ML: | 30 g/l 10 g/l | *SiO$_2$: *CeO$_2$: | 38 g/l 2 g/l | Ortho-phoshoric acid 20 g/l | Examples |
| 2 | Telechelic resin (terminal OH group) | *8-HQ: *PA | 35 g/l 5 g/l | *SiO$_2$: | 40 g/l | Ortho-phosphoric acid 20 g/l | |
| 3 | Core-shell emulsion resin | *PFP: | 40 g/l | SiO$_2$: CeO$_2$: | 38 g/l 2 g/l | Ortho-phosphoric acid 20 g/l | |
| 4 | Crosslinking resin *2-hydroxyethyl acrylate (90 parts by weight) *Isocyanate (10 parts by weight) | *PFP: *PA: | 35 g/l 5 g/l | SiO$_2$: | 40 g/l | Ortho-phosphoric acid 20 g/l | |
| 5 | Copolymer resin | TGB: TDT: | 30 g/l 10 g/l | SiO$_2$: CeO$_2$: | 38 g/l 2 g/l | Ortho-phosphoric acid 20 g/l | |
| 6 | Telechelic resin (terminal COOH group) | TGS: MC: | 30 g/l 10 g/l | SiO$_2$: CeO$_2$: | 38 g/l 2 g/l | Ortho-phosphoric acid 20 g/l | |
| 7 | Core-shell emulsion resin | *GL: | 40 g/l | SiO$_2$: CeO$_2$: | 38 g/l 2 g/l | Ortho-phosphoric acid 20 g/l | |
| 8 | Crosslinking resin *2-hydroxyethyl acrylate (80 parts by weight) *Acrylic acid (10 parts by weight) *Isocyanate (10 parts by weight) | PFP: PA: | 35 g/l 5 g/l | SiO$_2$: CeO$_2$: | 38 g/l 2 g/l | Ortho-phosphoric acid 20 g/l | |
| 9 | Core-shell emulsion resin | Gallic acid: 40 g/l (water-soluble) | | SiO$_2$: | 40 g/l | Ortho-phosphoric acid 20 g/l | Comparative Examples |
| 10 | — | Reduced chromic acid 30 g/l as CrO$_3$) | | SiO$_2$: | 40 g/l | Ortho-phosphoric acid 20 g/l | |

TGB: Butylthioglycolate
TGO: Octylthioglycolate
TGS: Stearylthioglycolate
ML: α-mercaptolauric acid
MC: α-mercaptocaproic acid
8-HQ: 8-hydroxyquinoline
TDT: 6-(N,N')-amino-1,3,5-triazine-2,4-dithiol
GL: Lauryl gallate
PFP: N-phenyl-3-formyl-2,5-dimethylpyrrole
PA: Polyaniline

TABLE 2

| Treatment Liquid | Matrix Resin (100 g/l) | Corrosion Inhibitor (40 g/l) | | Inorganic Colloid (40 g/l) | | Passivating Layer Forming Aid | | | Remarks |
|---|---|---|---|---|---|---|---|---|---|
| | | | | | | Metal Salt | | Phosphoric Acid | |
| 11 | Copolymer resin | *TGB: *ML: | 30 g/l 10 g/l | *SiO$_2$: | 40 g/l | *CeCl$_3$: *La(NO$_3$)$_3$: | 5 g/l 5 g/l | Ortho-phosphoric acid: 20 g/l | Examples |
| 12 | Telechelic resin (terminal OH group) | *8-HQ: *PA | 35 g/l 5 g/l | *SiO$_2$: | 40 g/l | *LaCl$_3$: | 10 g/l | Ortho-phosphoric acid: 20 g/l | |
| 13 | Core-shell emulsion resin | *PFP: | 40 g/l | *SiO$_2$: | 40 g/l | *Ce(NO$_3$)$_3$: | 10 g/l | Ortho-phosphoric acid: 20 g/l | |
| 14 | Crosslinking resin *2-hydroxyethyl acrylate (90 parts by weight) *Isocyanate (10 parts by weight) | *PFP: *PA: | 35 g/l 5 g/l | *SiO$_2$: | 40 g/l | *CeCl$_3$: *La(NO$_3$)$_3$: | 5 g/l 5 g/l | Ortho-phosphoric acid: 20 g/l | |

TABLE 2-continued

| Treatment Liquid | Matrix Resin (100 g/l) | Corrosion Inhibitor (40 g/l) | Inorganic Colloid (40 g/l) | Passivating Layer Forming Aid | | Remarks |
|---|---|---|---|---|---|---|
| | | | | Metal Salt | Phosphoric Acid | |
| 15 | SBR latex | *ML: 40 g/l | *SiO$_2$: 40 g/l | *Ce(NO$_3$)$_3$: 5 g/l<br>*LaCl$_3$: 5 g/l | Orthophosphoric acid: 20 g/l | |

Treatment Layer Performance Evaluation Method (a) Flat plate corrosion resistance was evaluated in terms of the ratio of the surface area on which rust formed after spraying the sample with 5% salt water at 35° C. Furthermore, the spraying times were 10 days for GI, EG and SZ, and 15 days for AL. All samples were measured for the incidence of white rust with the exception of CR which was measured for the incidence of red rust after 5 days.

Scoring

⊚: No formation of rust

○: Rust incidence of less than 5%

Δ: Rust incidence of greater than 5% but less than 20%

×: Rust incidence of greater than 20%

(b) Paint adhesion was evaluated in terms of the ratio of surface from which paint peeled in the cross-cut adhesion test (tape peeling from a pattern of 10 squares×10 squares measuring 1 mm on a side) following the application of melamine-alkyd paint onto the sample at a thickness of 20 μm, drying and immersion in boiling water for 30 minutes.

Scoring

⊚: No peeling

○: Peeling ratio less than 5%

Δ: Peeling ratio of greater than 5% but less than 20%

×: Peeling ratio of greater than 20%

(c) Resistance to fingerprints was evaluated in terms of the color difference (ΔE) before and after application of Vaseline on the sample. The smaller the color difference, the better the resistance to fingerprints.

⊚: ΔE<0.5

○: 0.5<ΔE<1.0

Δ: 1.0<ΔE<3.0

×: 3.0<ΔE (d) The layer on a steel plate was cut with a microtome and stained with tungsten phosphate, osmic acid, ruthenic acid and so forth followed by observation of the cross-sectional structure of the layer by TEM to determine the average particle size of the organic corrosion inhibitor.

The results of these performance evaluation tests are shown in Table 3. Furthermore, when the cross-sections of layers, which were formed by adding organic corrosion inhibitors in the same compositions as treatment liquids 1 through 10 without forming a colloid or micelle using a mixture of organic corrosion inhibitors forcibly mixed with a hand mixer for the treatment liquid, coating onto EG, drying and curing, were observed by TEM, the average particle size of the organic corrosion inhibitor was larger than 1 μm in all cases. Although similar evaluation tests were also performed on these layers, they all fell below the performance level of the present invention. Evaluation of corrosion resistance in particular resulted in an incidence of white rust of greater than 20% following spraying of salt water for 10 days.

As is clear from Table 3, treatment layers in which the hardly water-soluble organic corrosion inhibitor was dispersed in the form of a colloid or micelle according to the present invention demonstrated corrosion resistance and paint adhesion comparable to chromate layer, while demonstrating better resistance to fingerprints. Thus, the present invention is able to demonstrate excellent effects as a chemically treated layer that is completely free of hexavalent chromium and compatible with the environment.

TABLE 3

| Treatment Liquid | Steel Plate | Average particle size of organic corrosion inhibitor | Flat plate corrosion resistance | Paint adhesion | Fingerprint resistance | Remarks |
|---|---|---|---|---|---|---|
| 1 | EG<br>GI | 0.43 μm | ⊚<br>○ | ⊚<br>⊚ | ⊚<br>⊚ | Examples |
| 2 | EG, SZ, AL<br>GI | 0.17 μm | ⊚<br>⊚ | ⊚<br>○ | ⊚<br>⊚ | |
| 3 | EG, SZ<br>GI, AL | 0.22 μm | ⊚<br>⊚ | ⊚<br>○ | ⊚<br>⊚ | |
| 4 | EG<br>GI | 0.28 μm | ⊚<br>⊚ | ⊚<br>○ | ⊚<br>⊚ | |
| 5 | EG<br>GI | 0.52 μm | ⊚<br>○ | ○<br>⊚ | ⊚<br>⊚ | |
| 6 | EG, AL<br>SZ, GI | 0.75 μm | ○<br>⊚ | ○<br>⊚ | ⊚<br>⊚ | |
| 7 | EG, GI<br>CR | 0.82 μm | ○<br>⊚ | ○<br>⊚ | ⊚<br>⊚ | |
| 8 | AL<br>CR | 0.11 μm | ⊚<br>⊚ | ⊚<br>⊚ | ⊚<br>⊚ | |
| 9 | EG, GI<br>CR | — | Δ<br>Δ | Δ<br>Δ | ○<br>○ | Comp. Examples |
| 10 | EG<br>GI | — | ○<br>○ | Δ<br>Δ | Δ<br>Δ | |
| 11 | EG, SZ, AL<br>GI | 0.20 μm | ⊚<br>○ | ⊚<br>⊚ | ⊚<br>⊚ | Examples |
| 12 | EG, SZ, AL<br>GI | 0.17 μm | ⊚<br>⊚ | ⊚<br>○ | ⊚<br>⊚ | |
| 13 | EG, SZ, AL, GI<br>CR | 0.13 μm | ⊚<br>⊚ | ⊚<br>⊚ | ⊚<br>⊚ | |
| 14 | EG, GI<br>CR | 0.46 μm | ○<br>⊚ | ⊚<br>⊚ | ⊚<br>⊚ | |
| 15 | SZ, AL, GI<br>EG | 0.44 μm | ⊚<br>○ | ⊚<br>⊚ | ⊚<br>⊚ | |

As has been described above, the resin layer obtained by providing the hardly water-soluble organic corrosion inhibitor in the form of a colloid or micelle and mixing and dispersing with a resin having excellent layer forming properties, an inorganic colloid having the ability to prevent cathodic corrosion, and a passivating layer forming aid in accordance with the present invention, has the function of a gradually-released chemical that exhibits rust preventive effects as a result of the organic corrosion inhibitor colloid or micelle partially dissolved when triggered by the entry of moisture in a corrosive environment, thereby enabling it to demonstrate selective repair effects on corroded portions. Consequently, this treatment layer exhibits performance equal to or better than a layer containing hexavalent chromium and demonstrates extremely superior effects while also being environmentally friendly.

Industrial Applicability

Metal plates having the rust preventing organic layer of the present invention can be used as cold rolled steel plate, zinc-plated steel plate and other types of metal plates used in automobiles, home appliances and construction material applications.

What is claimed is:

1. A metal plate having a rust-preventive organic layer wherein the rust-preventive layer comprises a colloid or micelle of a non-water soluble organic corrosion inhibitor dispersed in a matrix resin, wherein said colloid or miscelle has an average particle size of less than 1 $\mu$m.

2. A metal plate having a rust-preventive organic layer as set forth in claim 1 wherein said colloid or micelle has a average particle size of 0.3 $\mu$m or less.

3. A metal plate having a rust-preventive organic layer as set forth in claim 1 wherein said non-water soluble organic corrosion inhibitor is one type or a mixture of two or more types of thioglycolate esters, mercaptocarboxylic acids, organic compounds having an N-substituted 2,5-dimethylpyrrole structure in the molecule, organic compounds having an 8-hydroxyquinoline structure in the molecule, organic compounds having a triazinethiol structure in the molecule, gallic acid esters, or electrically conductive polymers.

4. A metal plate having a rust-preventive organic layer as set forth in claim 1 wherein said matrix resin is a non-water-soluble copolymer resin composed of an organic polymer comprising one or a mixture of two or more types selected from the group consisting of vinyl-based carboxylic acids, vinyl-based amines, vinyl-based alcohols, and vinyl-based phosphates having an affinity with water, and one or a mixture of two or more types selected from the group consisting of vinyl-based compounds and olefins which do not form a hydrate.

5. A metal plate having a rust-preventive organic layer as set forth in claim 1 wherein said matrix resin is obtained from a non-water-soluble core-shell type emulsion resin comprising a core phase of an organic polymer of one or a mixture of two or more types selected from the group consisting of vinyl-based monomers and olefins which do not form a hydrate, and a shell phase of an organic polymer of a monomer having an affinity with water.

6. A metal plate having a rust-preventive organic layer as set forth in claim 1 wherein said matrix resin is a resin made non-water-soluble by curing a water-soluble vinyl-based resin using block isocyanate, amine, or carbolic acid.

7. A metal plate having a rust-preventive organic layer as set forth in claim 1 wherein said rust-preventive organic film contains, as additive in the said matrix resin, one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4 \cdot nH_2O$, $TiO_2$, $ZrPO_4$, $ZnO$, $La_2O_3$, $CeO_2$, or $Al_2O_3$ as well as colloids of complex compound of these inorganic substances.

8. A metal plate having a rust-preventive organic layer as set forth in claim 1 wherein said rust-preventive organic layer contains, as a passivating film forming aid in said matrix resin, one or a mixture of two or more types selected from the group consisting of ortho-phosphoric acid, poly-phosphoric acids, and meta-phosphoric acids.

9. A metal plate having a rust-preventive organic layer as set forth in claim 1 wherein said rust-preventive organic layer contains, as a passivating layer forming aid in said matrix resin, one or a mixture of two or more types selected from the group consisting of ortho-phosphoric acid, poly-phosphoric acids, and meta-phosphoric acids, and one type or a mixture of two or more types selected from the group consisting of cerium salts and lanthanum salts.

10. A treatment liquid for forming a rust-preventive organic layer, characterized by comprising a layer forming resin dissolved or dispersed in an aqueous medium, and a colloid or micelle of a non-water-soluble organic corrosion inhibitor dispersed in said aqueous medium, wherein said colloid or micelle has an average partice size of less than 1 $\mu$m.

11. A treatment liquid for forming a rust-preventive organic layer as set forth in claim 10 wherein said colloid or micelle has a average particle size of 0.3 $\mu$m or less.

12. A treatment liquid for forming a rust-preventive organic layer as set forth in claim 10 wherein said non-water-soluble organic corrosion inhibitor is one type or a mixture of two or more types of thioglycolate esters, mercaptocarboxylic acids, organic compounds having an N-substituted 2,5-dimethylpyrrole structure in the molecule, organic compounds having an 8-hydroxyquinoline structure in the molecule, organic compounds having a triazinethiol structure in the molecule, gallic acid esters, or electrically conductive polymers.

13. A treatment liquid for forming a rust-preventive organic layer as set forth in claim 10 wherein said layer forming resin is a non-water-soluble copolymer resin composed of an organic polymer comprising one or a mixture of two or more types selected from the group consisting of vinyl-based carboxylic acids, vinyl-based amines, vinyl-based alcohols, and vinyl-based phosphates having an affinity with water, and one or a mixture of two or more types selected from the group consisting of vinyl-based compounds and olefins which do not form a hydrate.

14. A treatment liquid for forming a rust-preventive organic layer as set forth in claim 10 wherein said layer forming resin is a non-water-soluble core-shell type emulsion resin comprising a core phase of an organic polymer of one or a mixture of two or more types selected from the group consisting of vinyl-based monomers and olefins which do not form a hydrate, and a shell phase of an organic polymer of a monomer having an affinity with water.

15. A treatment liquid for forming a rust-preventive organic layer as set forth in claim 10 wherein said layer forming resin is a resin made non-water-soluble by curing a water-soluble vinyl-based resin using block isocyanate, amine, or carboxylic acid.

16. A treatment liquid for forming a rust-preventive organic layer as set forth in claim 10 containing, as an additive, one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4 \cdot nH_2O$, $TiO_2$, $ZrPO_4$, $ZnO$, $La_2O_3$, $CeO_2$, or $Al_2O_3$ as well as colloids of complex compound of these inorganic substances.

17. A treatment liquid for forming a rust-preventive organic layer as set forth in claim 10 containing, as a passivating layer forming aid, one or a mixture of two or more types selected from the group consisting of ortho-phosphoric acid, poly-phosphoric acids, and meta-phosphoric acids.

18. A treatment liquid for forming a rust-preventive organic layer as set forth in claim 10 containing, as a passivating layer forming aid, one or a mixture of two or more types selected from the group consisting of ortho-phosphoric acid, poly-phosphoric acids, and meta-phosphoric acids, and one type or a mixture of two or more types selected from the group consisting of cerium salts and lanthanum salts.

19. A process for producing a metal plate having a rust-preventive organic layer, characterized by comprising applying to the surface of a metal plate a treatment liquid comprising a layer forming resin dissolved or dispersed in an aqueous medium, and a colloid or micelle of a non-water-soluble organic corrosion inhibitor having an average particle size of less than 1 $\mu$m dispersed in said aqueous medium and drying and curing the treatment liquid to form a rust-preventive organic layer on the surface of said metal plate.

20. A process for producing a metal plate having a rust-preventive organic layer as set forth in claim 19 wherein said colloid or micelle has a average particle size of 0.3 $\mu$m or less.

21. A process for producing a metal plate having a rust-preventive organic layer as set forth in claim 19 wherein said substantially non-water-soluble organic corrosion inhibitor is one type or a mixture of two or more types of thioglycolate esters, mercaptocarboxylic acids, organic compounds having an N-substituted 2,5-dimethylpyrrole structure in the molecule, organic compounds having an 8-hydroxyquinoline structure in the molecule, organic compounds having a triazinethiol structure of the molecule, gallic acid esters, or electrically conductive polymers.

22. A process for producing a metal plate having a rust-preventive organic layer as set forth in claim 19 wherein said layer forming resin is a non-water-soluble copolymer resin composed of an organic polymer comprising one or a mixture of two or more types selected from the group consisting of vinyl-based carboxylic acids, vinyl-based amines, vinyl-based alcohols, and vinyl-based phosphates having an affinity with water, and one or a mixture of two or more types selected from the group consisting of vinyl-based compounds and olefins which do not form a hydrate.

23. A process for producing a metal plate having a rust-preventive organic layer as set forth in claim 19 wherein said layer forming resin is a non-water-soluble core-shell type emulsion resin comprising a core phase of an organic polymer of one or a mixture of two or more types selected from the group consisting of vinyl-based monomers and olefins which do not form a hydrate, and a shell phase of an organic polymer of a monomer having an affinity with water.

24. A process for producing a metal plate having a rust-preventive organic layer as set forth in claim 19 wherein said layer forming resin is a resin made non-water-soluble by curing a water-soluble vinyl-based resin using block isocyanate, amine, or carboxylic acid.

25. A process for producing a metal plate hav g a rust-preventive organic layer as set forth in claim 19 wherein one or a mixture of two or more types of inorganic colloids of $Ca(OH)_2$, $CaCO_3$, $CaO$, $SiO_2$, $Zn_3(PO_4)_2$, $K_3PO_4$, $Ca_3(PO_4)_2$, $LaPO_4$, $La(H_2PO_4)_3$, $CePO_4$, $Ce(H_2PO_4)_3$, $Ce(H_2PO_4)_4$, $CaSiO_3$, $ZrSiO_3$, $AlPO_4 \cdot nH_2O$, $TiO_2$, $ZrPO_4$, $ZnO$, $La_2O_3$, $CeO_2$, or $Al_2O_3$ as well as complex colloids of compound of these inorganic substances is contained as an additive.

26. A process for producing a metal plate having a rust-preventive organic layer as set forth in claim 19 wherein one or a mixture of two or more types selected from the group consisting of ortho-phosphoric acid, poly-phosphoric acids and meta-phosphoric acids is contained as a passivating layer forming aid.

27. A process for producing a metal plate having a rust-preventive organic layer as set forth in claim 19 wherein one or a mixture of two or more types selected from the group consisting of ortho-phosphoric acid, poly-phosphoric acids, and meta-phosphoric acids, and one type or a mixture of two or more types selected from the group consisting of cerium salts and lanthanum salts is contained as a passivating layer forming aid.

28. A process for producing a metal plate having a rust-preventive organic layer as set forth in claim 19, wherein a non-water-soluble water-soluble organic corrosion inhibitor is dissolved in a solvent and deposited and dispersed in the form of a fine colloid or micelle in a non-solvent, to which a passivated layer forming aid and inorganic colloid are mixed and a dispersant as necessary is added to improve dispersivity, and a matrix resin is added to form said treatment liquid.

* * * * *